Figure 1:
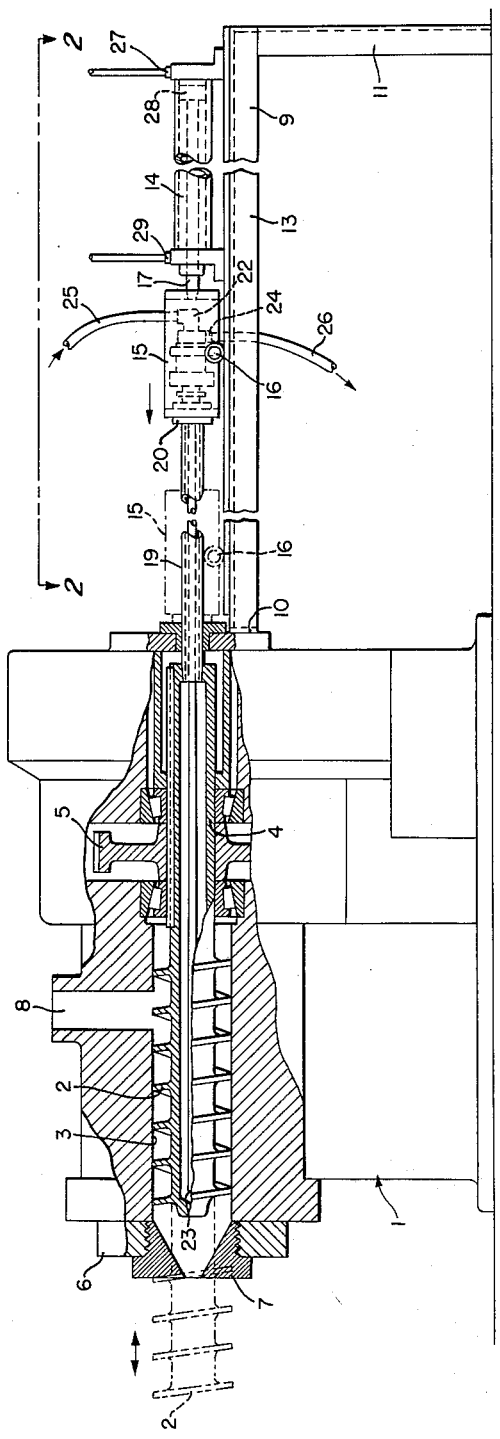

Jan. 9, 1962  V. E. RICE  3,015,844
EXTRUDING APPARATUS
Filed Nov. 5, 1959

INVENTOR.
VERNON E. RICE
BY
J. B. Holden
ATTORNEY

United States Patent Office 3,015,844
Patented Jan. 9, 1962

3,015,844
EXTRUDING APPARATUS
Vernon E. Rice, St. Marys, Ohio, assignor to The Goodyear Tire & Rubber Company, Akron, Ohio, a corporation of Ohio
Filed Nov. 5, 1959, Ser. No. 851,088
2 Claims. (Cl. 18—12)

This invention relates to an extruding machine and more particularly to an apparatus attached to such a machine to facilitate the cleaning of the extruder screw.

With the continuing expanded use of both plastic and elastomeric materials there is naturally an increased array of products made from these materials by the process of extruding. In any extruding machine where the material is forced through the forming die by an extruder screw, it is necessary that the chamber and screw be cleaned when the material is changed so as to eliminate the unnecessary mingling of the different materials. Where colored materials are used, it is absolutely essential that there be a complete elimination from the screw and chamber of any material of a different color than that which is to be extruded.

Under the usual procedures of cleaning the extruder screw and extrusion chamber considerable time is consumed in the cleaning operation and, as a result, the production capacity of the machine is reduced by the amount of time consumed in cleaning the machine. With the present invention the cleaning time is reduced to almost a negligible factor and, consequently, a material increase in the production capacity of the machine is effected. In addition, a more thorough job of cleaning the extruder screw and extruder chamber is accomplished which minimizes the waste of material due to contamination from other materials present in the extruded stock. It is, therefore, an object of this invention to provide a more efficient apparatus for cleaning the extruding screw and chamber of an extruding machine.

Another object of the invention is to provide an apparatus that is relatively simple and inexpensive for attachment to an extruding machine.

A further object of the invention is to provide an apparatus that provides for a much more efficient operation of the extruding machine by reducing the cleaning time to a bare minimum.

A still further object of the invention is to provide an apparatus that can be adapted to any of the present existing extruding machines without major alterations to the machine.

Other objects of this invention will appear hereinafter as the description proceeds, the novel features, arrangements and combinations being clearly pointed out in the specification and in the claims thereunto appended.

Figure 2:
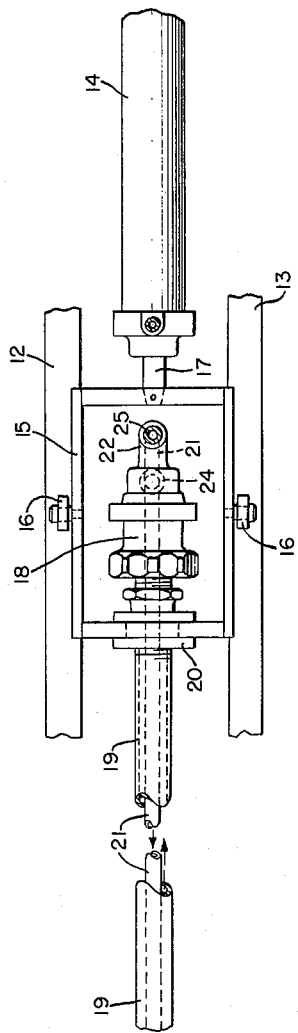

In the drawings:

FIG. 1 is a diagrammatic sectional elevation of the apparatus of the invention; and FIG. 2 is an enlarged partial plan view of a portion of the invention indicated by 2—2 in FIG. 1.

As seen in FIG. 1, a typical extruding machine 1 having the usual extruding screw 2 lying in the chamber 3 is illustrated. The extruder screw 2 includes an extension 4 to which the ring gear 5 is keyed in the usual manner to drive the extruding screw 2. At the outlet end 6 of the extruder a forming die 7 is attached which determines the cross-sectional shape of the extruded product. The material to be extruded is fed into the extruding chamber 3 through the feed opening 8 and thence is moved along the extruding chamber 3 by the extruder screw 2, thence out through the opening in the die 7.

In the apparatus of this invention a supporting framework 9 as shown, formed of angle iron is attached to the back of the tube member at 10 and the outer end is supported by supporting legs 11 so that the surface of the framework 9 is substantially parallel to the axis of the extruder screw. The supporting framework consists of a pair of parallel ways 12 and 13 on which the ejector cylinder 14 and coupling member 15 are supported. As shown rotatable wheels 16 attached to the sides of the coupling 15 permit the coupling to move freely over ways 12 and 13 and prevent sag.

The ejecting cylinder 14 is fixed to the outer end of ways 12 and 13 by bolting or in any other desired manner so that the piston rod 17 when extending from the cylinder 14 toward the extruder is axially aligned with the extruder screw 2. Attached to the end of the piston rod 17 is coupling member 15 which as shown is in the form of an open rectangular framework which surrounds a rotary joint 18, the purpose of which will be explained later. The coupling 15 transmits the load of cylinder 14 directly to a tubular extension 19 fixed to the extruder screw 2 and rotatably mounted in coupling 15. As illustrated, the tubular extension 19 is supported by a bearing member 20 mounted in the end plate of the coupling 15. The member 20 rotates with the extension 19 to permit the rotation in the end plate of coupling 15 during the operation of the extruded screw 2.

Interiorly of the framework of the coupling 15 and attached to the bearing member 20 is a rotary joint 18 so that cooling fluid may be circulated through the tubular extension 19 and interior of extruder screw 2 to provide for control of the temperature in the extruding chamber. In the particular form of the apparatus shown a hollow tube or pipe 21 of smaller outside diameter than the inside diameter of the tubular extension 19 extends interiorly of extension 19 from the rotary joint 18 to adjacent the opposite end of the extruder screw. The cooling fluid enters the rotary joint through inlet 22 and passes through the interior of the tube 21 out the open end 23, thence returns around tube member 21 and interiorly of the screw and tubular extension 19 to the outlet 24. Attached to the inlet 22 and outlet 24 are flexible tubes 25 and 26 connected to a source of cooling liquid and discharge receptacle respectively.

When the operator desires to clean the extruder screw, the extruding die is removed from the tube machine in the usual manner, then the cylinder 14 is activated by applying hydraulic pressure through opening 27 in the cylinder to urge piston 28 to the opposite end thereof. A hydraulic cylinder is illustrated and generally preferred because of the safety factor in preventing a sudden ejection of the screw although with proper controls pneumatic pressure could be used. Thus the coupling 15 is urged toward the extruder (dotted line position in FIG. 1) to move the extension 19 into the extruder 1 to project the extruder screw 2 out the end of the extruder (indicated by the dotted lines in FIG. 1). The projecting end is then readily accessible for cleaning and may be visually examined for the thoroughness of the job. After the extruder screw is cleaned, the cylinder is again activated by passing pressure thereinto through the opening 29 to return the piston 28 to the original position in the cylinder 14. This draws the extruder screw back into the extruding chamber in its original position. A die then is attached to the extruder in the usual manner.

In most extruders the gear 5 will not move during the operation of cylinder but the extension 4 will slide therethrough. Preferably, the key on the gear shaft and extension should be slightly reduced in size and the ends tapered to provide for easy entry of the key into the keyway of the gear when the screw is returned to its original position.

It is apparent that the coupling and rotary joint as illustrated may be eliminated if the temperature of the extruder screw is not controlled. The screw extension in that instance, would be attached directly to the piston rod for moving the screw in and out of the cylinder. The length of travel of the piston is preferably sufficient to eject a substantial portion of the screw out of the extruder chamber so that the screw is readily accessible for cleaning. The particular design features of the extruder to which the apparatus is to be attached will necessitate variations in specific features but this will be apparent and will not alter the principle of operation.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. An extruding machine having an extrusion chamber and extruding screw normally operating in said chamber, driving means directly fixed to a portion of said screw, a removable extrusion die on one end of said chamber adjacent the end of said screw and a screw ejecting and retracting means to eject said screw from and retract said screw into said chamber, said screw ejecting and retracting means comprising an extension rigidly attached to the end of said screw opposite the die end thereof and normally projecting axially outwardly beyond the chamber, the length of said extension being at least equal to a substantial portion of that of said screw, a fluid pressure cylinder having a piston and rod therein in fixed position with respect to and spaced from said extruding machine, the cylinder being arranged in tandem with the outer end of said screw extension, a coupling between the rod of said cylinder and end of said extension and attached to the extrusion and rod to permit rotation of said extension during operation of said extruding machine while the rod remains stationary, and a support underlying said coupling to support and guide said coupling when said fluid pressure cylinder is activated to move the piston therein to project the rod out of the cylinder to push the extension into said extrusion chamber to eject the extruding screw therefrom subsequent to the removal of the extrusion die and return the extruding screw into said extrusion chamber when the cylinder is activated in the reverse direction.

2. An extruding machine having an extrusion chamber and extruding screw normally operating in said chamber, driving means directly fixed to a portion of said screw a removable extrusion die on one end of said chamber adjacent the end of said screw and a screw ejecting means to eject said screw from said chamber, said screw ejecting and retreating means comprising an extension rigidly attached to the end of said screw opposite the die end thereof and normally projecting outwardly beyond the chamber, the interior of said extension being in communication with the interior of said screw and the length of said extension being at least equal to a substantial portion of that of said screw, a fluid pressure cylinder having a piston and rod therein in fixed position with respect to and spaced from said extruding machine, said cylinder being axially aligned with said screw extension, a coupling between the rod of said cylinder and end of said extension and attached to the extension and rod to permit rotation of said extension during operation of said extruding machine while the rod remains stationary and means attached to said extension to pass a coolant liquid through said extension and extruding screw.

References Cited in the file of this patent

UNITED STATES PATENTS

| | | |
|---|---|---|
| 2,090,434 | Thalmann | Aug. 17, 1937 |
| 2,641,800 | Myers | June 16, 1953 |
| 2,653,348 | Elgin et al. | Sept. 29, 1953 |
| 2,763,374 | Corbett | Sept. 18, 1956 |

UNITED STATES PATENT OFFICE
CERTIFICATE OF CORRECTION

Patent No. 3,015,844  
January 9, 1962

Vernon E. Rice

It is hereby certified that error appears in the above numbered patent requiring correction and that the said Letters Patent should read as corrected below.

Column 3, line 35, for "extrusion" read -- extension --; column 4, line 14, for "retreating" read -- retracting --.

Signed and sealed this 15th day of May 1962.

(SEAL)  
Attest:

ERNEST W. SWIDER  
Attesting Officer

DAVID L. LADD  
Commissioner of Patents